(12) United States Patent
Sol

(10) Patent No.: US 10,492,044 B2
(45) Date of Patent: Nov. 26, 2019

(54) ENTERTAINING SYSTEM OF VEHICLE, METHOD FOR CONNECTING WIRELESS, AND PROCESSING SOUND USING THE SAME

(71) Applicants: Hyundai Motor Company, Seoul (KR); Kia Motors Corporation, Seoul (KR)

(72) Inventor: Un Hwan Sol, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/050,642

(22) Filed: Jul. 31, 2018

(65) Prior Publication Data

US 2019/0320302 A1 Oct. 17, 2019

(30) Foreign Application Priority Data

Apr. 17, 2018 (KR) .......................... 10-2018-0044494

(51) Int. Cl.
*H04W 4/48* (2018.01)
*H04M 1/60* (2006.01)
*B60R 11/02* (2006.01)

(52) U.S. Cl.
CPC ........... *H04W 4/48* (2018.02); *B60R 11/0217* (2013.01); *B60R 11/0264* (2013.01); *H04M 1/6091* (2013.01); *B60R 2011/0276* (2013.01); *B60R 2011/0294* (2013.01)

(58) Field of Classification Search
CPC ............. B60R 11/0217; B60R 11/0264; B60R 2011/0294; B60R 2011/0276; H04M 1/6091; H04W 4/48
USPC .......................................................... 381/86
See application file for complete search history.

(56) References Cited

U.S. PATENT DOCUMENTS

| 8,456,985 | B2 | 6/2013 | Hannosh et al. |
| 2016/0360353 | A1 | 12/2016 | Brenner et al. |
| 2017/0276764 | A1* | 9/2017 | Vilermo .................... G01S 3/02 |

FOREIGN PATENT DOCUMENTS

| JP | 20130163472 A | 8/2013 |
| JP | 2016504777 A | 2/2016 |
| JP | 2016061868 A | 4/2016 |
| KR | 101755310 B1 | 7/2017 |

* cited by examiner

*Primary Examiner* — Paul Kim
(74) *Attorney, Agent, or Firm* — Mintz Levin Cohn Ferris Glovsky and Popeo, P.C.; Peter F. Corless

(57) ABSTRACT

An entertainment system of a vehicle can include: a mobile terminal of a passenger, an audio output device of the passenger wirelessly connected with the mobile terminal, a rear seat entertainment unit wirelessly connected with the mobile terminal, and a control unit connected with the rear seat entertainment unit, the control unit configured to control the rear seat entertainment unit so as to automatically and wirelessly connect with the audio output device when pairing information of the audio output device is requested by the rear seat entertainment unit and the pairing information of the audio output device is received by the rear seat entertainment unit.

17 Claims, 12 Drawing Sheets

ENTERTAINING SYSTEM OF VEHICLE, METHOD FOR CONNECTING WIRELESS, AND PROCESSING SOUND USING THE SAME

CROSS-REFERENCE TO RELATED APPLICATION

This application claims the benefit of priority to Korean Patent Application No. 10-2018-0044494, filed on Apr. 17, 2018 in the Korean Intellectual Property Office, which is hereby incorporated by reference as if fully set forth herein.

BACKGROUND OF THE DISCLOSURE

Field of the Disclosure

The present disclosure relates to an entertainment system of a vehicle, and more particularly, to an entertainment system of a vehicle capable of automatically connecting a wireless audio output device, such as a wireless headphone, earphone, etc., to an entertainment device in the vehicle, as well as a wireless connection thereof, and a sound processing method.

Discussion of the Related Art

Generally, in the case of a conventional vehicle, when a rear seat entertainment (hereinafter, RSE) system is used, it is able to provide sound from media through a wired connection, such as auxiliary (AUX) jack, or a dedicated wireless headphone wirelessly connected with the RSE system in advance. In other words, it is necessary either to have a dedicated headphone installed in the vehicle, a wired-type personal headphone/earphone, or a jack conversion adaptor in order to listen to sound from media played by the RSE system, depending on the vehicle.

Recently, as the use of wireless headphones, earphones, and the like, paired with a user's mobile terminal such as a smartphone has increased, an increasing number of passengers occupy the rear seat of a vehicle while wearing these wireless devices. However, since the wireless headphones or earphones are only wirelessly connected with the user's mobile terminal, the passenger is unable to listen to sound from media played by the RSE of the vehicle.

Typically, in order to listen to the sound from media played by the RSE system, it is necessary for the passenger to manually register and connect the wireless device with the system of the vehicle, often creating inconvenience for the passenger.

Additionally, in the case of noise-canceling wireless noise-canceling headphones, the noise cancelation efficiency is often degraded due to media playing in the front seat (FRT) which is outputted via a speaker of a vehicle and thus acts as noise. Therefore, it is necessary to develop an entertainment system capable of automatically connecting a wireless audio output device, such as a wireless headphone, earphone, or the like, to a vehicle entertainment device, while enhancing the noise-canceling functionality of the device.

SUMMARY OF THE DISCLOSURE

Accordingly, the present disclosure is directed to an apparatus and method thereof that substantially obviate one or more problems due to limitations and disadvantages of the related art.

An object of the present disclosure is to provide an entertainment system of a vehicle capable of automatically and wirelessly connecting a rear seat entertainment (RSE) unit of the vehicle with an audio output device of a passenger and enhancing user convenience by receiving pairing information of the audio output device from a mobile terminal of the passenger wirelessly connected to the audio output device via the RSE unit, as well as a wireless connection thereof, and a sound processing method.

Another object of the present disclosure is to provide an entertainment system of a vehicle capable of providing image playback sound of which a noise cancelation efficiency is enhanced in a manner that a sound processing unit calculates a playback sound output adjustment value based on a playback sound output volume value outputted from a vehicle speaker and a playback sound input volume value measured from an audio output device, corrects image playback sound based on the calculated value, and transmits the corrected image playback sound to the audio output device of the passenger, as well as a wireless connection thereof, and a sound processing method.

Technical tasks obtainable from the present disclosure are not limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, according to embodiments of the present disclosure, an entertainment system of a vehicle can include: a mobile terminal of a passenger, an audio output device of the passenger wirelessly connected with the mobile terminal, a rear seat entertainment unit wirelessly connected with the mobile terminal, and a control unit connected with the rear seat entertainment unit, the control unit configured to control the rear seat entertainment unit so as to automatically and wirelessly connect with the audio output device when pairing information of the audio output device is requested by the rear seat entertainment unit and the pairing information of the audio output device is received by the rear seat entertainment unit.

In this case, the entertainment system can further include a sound processing unit configured to process a music source playback sound of a front multimedia unit of the vehicle. If a music source playback sound synchronization request signal is received from the control unit, the sound processing unit can calculate a playback sound output adjustment value based on a playback sound output volume value outputted from a vehicle speaker and a playback sound input volume value measured by the audio output device according to the music source playback sound synchronization request signal, and the sound processing unit can transmit the calculated playback sound output adjustment value to the control unit.

If the playback sound output adjustment value is received from the sound processing unit, the control unit can correct the music source playback sound based on the received playback sound output adjustment value and can transmit the corrected music source playback sound to the audio output device of the passenger via the rear seat entertainment unit.

To further achieve these objects and other advantages and in accordance with the purpose of the disclosure, as embodied and broadly described herein, according to embodiments of the present disclosure, a method of wirelessly connecting an entertainment system of a vehicle can include: wirelessly connecting the rear seat entertainment unit with a mobile terminal of a passenger when the mobile terminal is positioned within the vehicle, the mobile terminal being wirelessly connected with an audio output device of the passenger; connecting the control unit with the rear seat entertainment unit; requesting, by the control unit, that pairing information of the audio output device be transmitted to the rear seat entertainment unit; requesting, by the rear seat entertainment unit, the pairing information of the audio output device from the mobile terminal when the rear seat entertainment unit receives a request signal for the pairing information of the audio output device from the control unit; transmitting, by the rear seat entertainment unit, the pairing information of the audio output device to the control unit when the rear seat entertainment unit receives the pairing information of the audio output device from the mobile terminal; and controlling, by the control unit, the rear seat entertainment unit so as to automatically and wirelessly connect with the audio output device when the control unit receives the pairing information of the audio output device from the rear seat entertainment unit.

To further achieve these objects and other advantages and in accordance with the purpose of the disclosure, as embodied and broadly described herein, according to embodiments of the present disclosure, a method of processing sound in an entertainment system of a vehicle can include: transmitting, by the control unit, a music source playback sound synchronization request signal to the sound processing unit when the rear seat entertainment unit is wirelessly connected with an audio output device of a passenger; receiving, by the control unit, information of a playback sound input volume value measured by the audio output device from the rear seat entertainment unit; transmitting, by the control unit, the received information of the playback sound input volume value to the sound processing unit; calculating, by the sound processing unit, the playback sound output adjustment value based on a playback sound output volume value outputted from a vehicle speaker and the playback sound input volume value measured by the audio output device when the sound processing unit receives the playback sound input volume value measured by the audio output device from the control unit; transmitting, by the sound processing unit, the calculated playback sound output adjustment value to the control unit; transmitting, by the control unit, an image signal to the rear seat entertainment unit; correcting, by the control unit, a music source playback sound corresponding to the image signal based on the received playback sound output adjustment value; and transmitting, by the control unit, the corrected music source playback sound to the audio output device via the rear seat entertainment unit.

Utilizing an entertainment system of a vehicle, as well as wireless connection thereof, and a sound processing method according to embodiments of the present disclosure, can enhance user convenience by receiving pairing information of an audio output device from a mobile terminal wirelessly connected to the audio output device of the passenger via a rear seat entertainment (RSE) unit and automatically and wirelessly connecting the rear seat entertainment unit of a vehicle with the audio output unit of the passenger.

According to embodiments of the present disclosure, image playback sound of which a noise cancelation efficiency is enhanced can be provided in a manner that a sound processing unit calculates a playback sound output adjustment value based on a playback sound output volume value outputted from a vehicle speaker and a playback sound input volume value measured by an audio output device, corrects image playback sound based on the calculated value, and transmits the corrected image playback sound to an audio output device of a passenger.

Effects obtainable from the present disclosure are not limited by the above mentioned effects. Other unmentioned effects can be clearly understood from the following description by those having ordinary skill in the technical field to which the present disclosure pertains.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Figure 1:
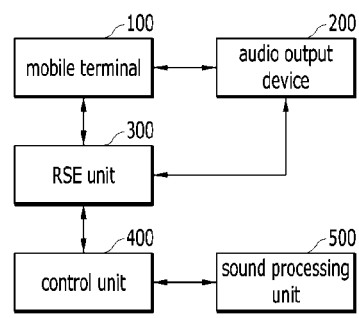
FIG. 1 is a block diagram for explaining an entertainment system of a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Reference will now be made in detail to the embodiments of the present disclosure, examples of which are illustrated in the accompanying drawings, to facilitate those having ordinary skill in the art to implement the disclosure. The present disclosure can be implemented in various different forms and is not restricted to the embodiment of the present disclosure. Wherever possible, the same reference numbers will be used throughout the drawings to refer to the same or like parts.

Throughout the entire description of the present specification, when one part is said to "include" an element, unless specifically mentioned otherwise, instead of excluding any other element, this may signify that the one part may further include other elements. Furthermore, the term "unit (or part)", which is mentioned in the present specification, refers to a unit for processing at least one function or operation, and this may be realized in the form of hardware, software, or in a combination of both hardware and software.

Moreover, throughout the entire description of the present specification, when one part is said to "include" an element, unless specifically mentioned otherwise, instead of excluding any other element, this may signify that the one part may further include other elements. Wherever possible, the same reference numbers will be used throughout the drawings to refer to the same or like parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

In the following, an entertainment system of a vehicle, a wireless connection thereof, and a sound processing method applicable to embodiments of the present disclosure are explained in detail with reference to FIGS. 1 to 12.

Figure 2:
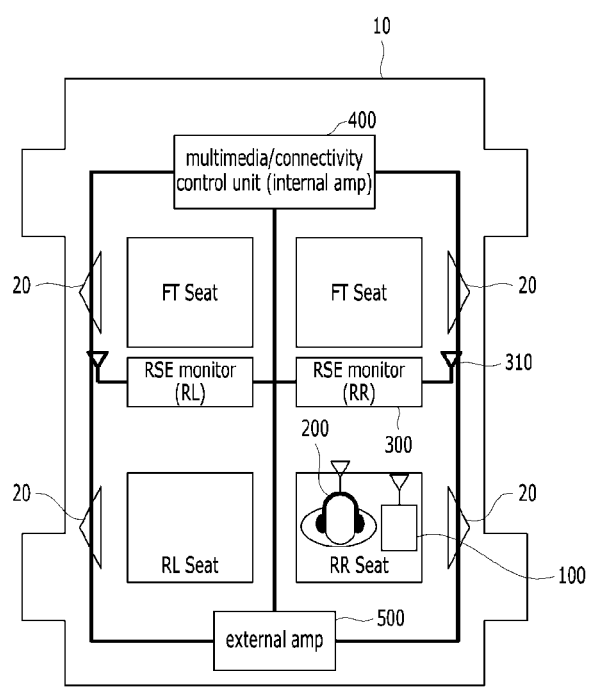
FIG. 2 is a schematic diagram for explaining an entertainment system of a vehicle according to embodiments of the present disclosure.

FIG. 1 is a block diagram for explaining an entertainment system of a vehicle according to embodiments of the present disclosure, and FIG. 2 is a schematic diagram for explaining an entertainment system of a vehicle according to embodiments of the present disclosure.

As shown in FIGS. 1 and 2, an entertainment system of a vehicle according to embodiments of the present disclosure can include a mobile terminal 100 of a vehicle passenger, an audio output device 200 of the vehicle passenger wirelessly connected with the mobile terminal 100, a rear seat entertainment (RSE) unit 300 wirelessly connected with the mobile terminal 100, a control unit 400 connected with the RSE unit 300, and a sound processing unit 500 configured to process music source playback sound of a front multimedia unit of the vehicle in a manner of being connected with the control unit 400.

In this case, the mobile terminal 100 may correspond to a terminal such as, for example, a wearable device, a cellular phone, a smartphone, a laptop computer, a digital broadcasting terminal, a PDA (personal digital assistants), a PMP (portable multimedia player), a navigation, a slate PC, a tablet PC, an ultra-book, a smart watch, a smart glass, and an HMD (head mounted display), though the present disclosure is not limited thereto.

The audio output device 200 may correspond to a device such as, for example, a wireless headphone, a wireless earphone, a wireless ear set, a wireless headset, and the like, worn by a passenger of the vehicle, though the present disclosure is not limited thereto.

For example, the audio output device 200 may feature a noise-canceling function. In some cases, a microphone can be additionally embedded in the audio output device. Also, a multi-connection function can be added to the audio output device 200.

When the audio output device 200 is able to support the multi-connection function, if the audio output device 200 is automatically and wirelessly connected with the rear seat entertainment unit 300, the audio output device 200 can continuously maintain a wireless connection with the mobile terminal 100.

As a different case, when the audio output device 200 does not support a multi-connection function (allowing the audio output device 200 to be connected with multiple devices), if the audio output device 200 is currently wirelessly connected with the rear seat entertainment unit 300, the audio output device 200 may block a wireless connection with the mobile terminal 100.

Also, the audio output device 200 can include a noise-canceling microphone configured to measure an input volume value of inputted music source playback sound when the music source playback sound of a front multimedia unit is outputted via a vehicle speaker located at a front region of the vehicle.

If the audio output device 200 is automatically and wirelessly connected with the rear seat entertainment unit 300 and receives an input volume value request signal of the music source playback sound from the rear seat entertainment unit 300, the audio output device 200 can transmit an input volume value of the measured music source playback sound to the rear seat entertainment unit 300.

The rear seat entertainment unit 300 includes a radio frequency (RF) antenna 310 and can include a monitor which is deployed while facing a rear seat of a vehicle 10.

In this case, if the mobile terminal 100 of the passenger is positioned within the vehicle 10, the rear seat entertainment unit 300 can be automatically connected with the mobile terminal 100 and the control unit 400 through the RF antenna 310.

If the rear seat entertainment unit 300 receives a pairing information request signal for the audio output device 200 of the passenger from the control unit 400, the rear seat entertainment unit 300 requests pairing information of the audio output device 200 to the mobile terminal 100 of the passenger. Having received the pairing information of the audio output device 200 from the mobile terminal 100, the rear seat entertainment unit 300 can transmit the pairing information of the audio output device 200 to the control unit 400.

In some cases, when the rear seat entertainment unit 300 requests the pairing information of the audio output device 200 to the mobile terminal 100, if the pairing information of the audio output device 200 is not received from the mobile terminal 100 for more than predetermined time, the rear seat entertainment unit 300 may request the pairing information of the audio output device 200 to the mobile terminal 100 again.

In a different case, when the rear seat entertainment unit 300 requests the pairing information of the audio output device 200 to the mobile terminal 100 again, if the pairing information of the audio output device 200 is not received from the mobile terminal 100 for more than predetermined time, the rear seat entertainment unit 300 may request the pairing information of the audio output device 200 to the mobile terminal 100 again according to a predetermined request count.

In a further different case, when the rear seat entertainment unit 300 repeatedly requests the pairing information of the audio output device 200 to the mobile terminal 100 again according to the predetermined request count, if the pairing information of the audio output device 200 is not received from the mobile terminal 100, the rear seat entertainment unit 300 recognizes it as the mobile terminal is not connected with the audio output device 200 and may be able to transmit a pairing information request termination signal to the control unit 400 while stopping the request of the pairing information.

The control unit 400 may correspond to a control unit of multimedia and connectivity.

In some cases, the control unit 400 can include a sound processing unit configured to process music source playback sound of front multimedia. In this regard, the sound processing unit can include an internal amplifier having a sound processing module.

The control unit 400 requests pairing information of the audio output unit 200 of the passenger to the rear seat entertainment unit 300. Having received the pairing information of the audio output unit 200 from the rear seat entertainment unit 300, the control unit 400 can control the rear seat entertainment unit 300 to be automatically and wirelessly connected with the audio output device 200.

In some cases, when the control unit 400 requests the pairing information of the audio output device 200 to the rear seat entertainment unit 300, the control unit 400 determines whether or not a music source of a front multimedia unit (e.g., one or more vehicle speakers disposed at a front region of the vehicle) is played. If the music source of the front multimedia unit is played via a speaker 20 of a vehicle, the control unit 400 can request the pairing information of the audio output device 200 to the rear seat entertainment unit 300.

In a different case, when the control unit 400 requests the pairing information of the audio output device 200 to the rear seat entertainment unit 300, the control unit 400 checks whether or not the rear seat entertainment unit 300 is connected with the mobile terminal 100. If the rear seat entertainment unit 300 is connected with the mobile terminal 100, the control unit 400 can request the pairing information of the audio output device 200 to the rear seat entertainment unit 300.

In a further different case, when the control unit 400 receives the pairing information of the audio output device 200 from the rear seat entertainment unit 300, the control unit 400 determines whether or not at least one of information on the audio output device 200 or an authentication code is included in the pairing information. If the at least one of the information on the audio output device 200 or the authentication code is included in the pairing information, the control unit 400 can store the pairing information.

Subsequently, the control unit 400 can be connected with a sound processing unit 500 configured to process music source playback sound of front multimedia. In this case, the sound processing unit 500 can include an external amplifier having a sound processing module.

If the sound processing unit 500 receives a music source playback sound synchronization request signal from the control unit 400, the sound processing unit calculates a playback sound output adjustment value based on a playback sound output value outputted from a vehicle speaker 20 and a playback sound input volume value measured from the audio output device 200 according to the music source playback sound synchronization request signal and can transmit the calculated playback sound output adjustment value to the control unit 400.

For example, if the sound processing unit 500 receives the music source playback sound synchronization request signal from the control unit 400, the sound processing unit 500 measures a playback sound output volume value outputted from the vehicle speaker 20. If the sound processing unit 500 receives a playback sound input volume value measured at the audio output device 200 from the control unit 200, the sound processing unit 500 can calculate a playback sound output adjustment value based on the playback sound output volume value outputted from the vehicle speaker 20 and the playback sound input volume value measured from the audio output device 200.

In this case, when the playback sound output adjustment value is calculated, the sound processing unit 500 calculates a difference value between the playback sound output volume value outputted from the vehicle speaker 20 and the playback sound input volume value measured from the audio output device 200 to calculate the playback sound output adjustment value.

The control unit 400 checks whether or not a music source of a front multimedia unit is played. If the music source of the front multimedia unit is played, the control unit 400 can transmit a music source playback sound synchronization request signal to the sound processing unit 500.

In this case, when the music source playback sound synchronization request signal is transmitted to the sound processing unit 500, the control unit 400 can request information on the playback sound input volume value measured at the audio output device 200 to the rear seat entertainment unit 300.

If the information on the playback sound input volume value measured at the audio output device 200 is received from the rear seat entertainment unit 300 in response to the request of the information on the playback sound input volume value measured at the audio output device 200, the control unit 400 can transmit the information on the playback sound input volume value measured at the audio output device 200 to the sound processing unit 500.

Subsequently, if the playback sound output adjustment value is received from the sound processing unit 500, the control unit 400 corrects music source playback sound based on the received playback sound output adjustment value and can transmit the corrected music source playback sound to the audio output device 200 of the passenger via the rear seat entertainment unit 300.

Subsequently, when the control unit 400 transmits the corrected music source playback sound, the control unit 400 can transmit an image signal corresponding to the music source playback sound to the rear seat entertainment unit 300 to display an image corresponding to the music source playback sound.

In this case, when the control unit 400 transmits the image signal corresponding to the music source playback sound to the rear seat entertainment unit 300, the image signal may correspond to one selected from the group consisting of a media image stored in the vehicle 10 in advance, a media image received from an interface of the vehicle 10, and a media image of the mobile terminal 100 received via the rear seat entertainment unit 300.

In particular, according to embodiments of the present disclosure, user convenience can be enhanced by automatically and wirelessly connecting the rear seat entertainment unit of the vehicle with the audio output device of the passenger by receiving pairing information of the audio output device from the mobile terminal wirelessly connected with the audio output device of the passenger via the rear seat entertainment (RSE) unit.

Also, according to embodiments of the present disclosure, the sound processing unit calculates a playback sound output adjustment value based on a playback sound output volume value outputted from a vehicle speaker and a playback sound input volume value measured from the audio output device, corrects playback sound of an image based on the calculated playback sound output adjustment value, and transmits the corrected playback sound to the audio output device of a passenger. By doing so, it is able to provide image playback sound of which noise cancelation efficiency is enhanced to the passenger.

FIGS. 3 to 9 are diagrams for explaining a wireless connection and a sound processing procedure of an entertainment system of a vehicle according to embodiments of the present disclosure.

Figure 3:
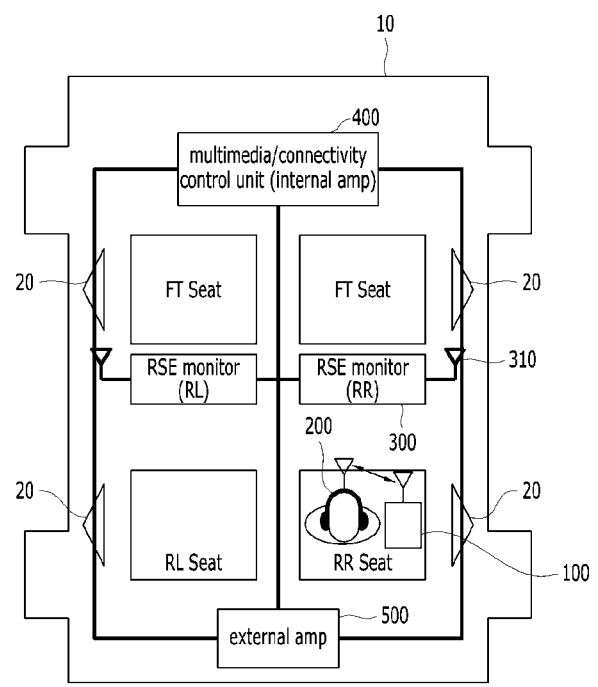
FIGS. 3 to 9 are diagrams for explaining a wireless connection and a sound processing procedure of an entertainment system of a vehicle according to embodiments of the present disclosure.

First of all, as shown in FIG. 3, a vehicle passenger wearing an audio output device 200, which is wirelessly connected with a mobile terminal 100, enters a vehicle 10 and may take a rear seat of the vehicle 10.

In this case, the audio output device 200 may be a device such as, for example, a wireless headphone, a wireless earphone, a wireless ear set, a wireless headset, or the like, worn on a vehicle passenger, though the present disclosure is not limited thereto.

For example, the audio output device 200 may feature a noise-canceling function. In some cases, a microphone can be additionally embedded in the audio output device.

In some cases, a multi-connection supporting function can be added to the audio output device 200.

Figure 4:
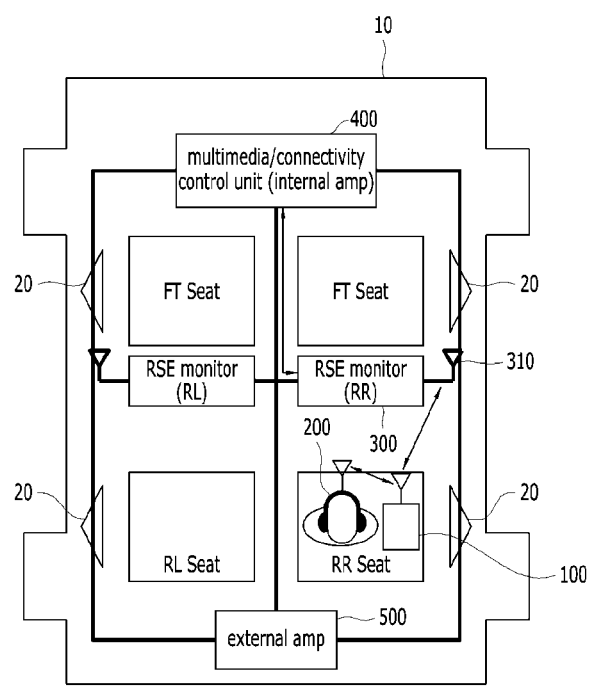

Subsequently, as shown in FIG. 4, if the mobile terminal 100, which is wirelessly connected with the audio output device 200 of the vehicle passenger, is positioned within the vehicle 10, a rear seat entertainment unit 300 of the vehicle 10 can be wirelessly connected with the mobile terminal 100 of the passenger.

In this case, the rear seat entertainment unit 300 can include an RF antenna 310 and can be wirelessly connected with the mobile terminal 100 of the passenger via the RF antenna 310.

If the rear seat entertainment unit 300 is wirelessly connected with the mobile terminal 100, a control unit 400 can be connected with the rear seat entertainment unit 300 which is wirelessly connected with the mobile terminal 100. In this case, the communication connection between the control unit 400 and the rear seat entertainment unit 300 can be connected in wired or wireless.

The control unit 400 may support functionality relating to multimedia and connectivity.

In some cases, the control unit 400 may include a sound processing unit configured to process music source playback sound of a front multimedia.

In this case, the sound processing unit may include an internal amplifier having a sound processing module.

Figure 5:
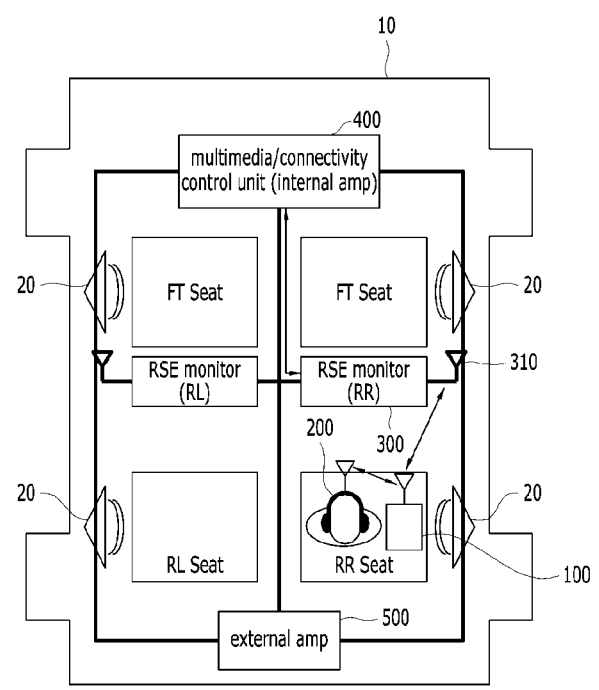

Subsequently, as shown in FIG. 5, the control unit 400 can request pairing information of the audio output device 200 to the rear seat entertainment unit 300.

In this case, when the control unit 400 requests the pairing information of the audio output device 200 to the rear seat entertainment unit 300, the control unit 400 determines whether or not a music source of a front multimedia unit is played via the vehicle speaker 20. If the music source of the front multimedia unit is played, the control unit 400 can request the pairing information of the audio output device 200 to the rear seat entertainment unit 300.

In a different case, when the control unit 400 requests the pairing information of the audio output device 200 to the rear seat entertainment unit 300, the control unit 400 checks whether or not the rear seat entertainment unit 300 is connected with the mobile terminal 100. If the rear seat entertainment unit 300 is connected with the mobile terminal 100, the control unit 400 can request the pairing information of the audio output device 200 to the rear seat entertainment unit 300.

If the rear seat entertainment unit 300 receives a pairing information request signal for the audio output device 200 of the passenger from the control unit 400, the rear seat entertainment unit 300 can request pairing information of the audio output device 200 to the mobile terminal 100.

In some cases, when the rear seat entertainment unit 300 requests the pairing information of the audio output device 200 to the mobile terminal 100, if the pairing information of the audio output device 200 is not received from the mobile terminal 100 for more than predetermined time, the rear seat entertainment unit 300 may request the pairing information of the audio output device 200 to the mobile terminal 100 again.

In a different case, when the rear seat entertainment unit 300 requests the pairing information of the audio output device 200 to the mobile terminal 100 again, if the pairing information of the audio output device 200 is not received from the mobile terminal 100 for more than predetermined time, the rear seat entertainment unit 300 may request the pairing information of the audio output device 200 to the mobile terminal 100 again according to a predetermined request count.

In a further different case, when the rear seat entertainment unit 300 repeatedly requests the pairing information of the audio output device 200 to the mobile terminal 100 again according to the predetermined request count, if the pairing information of the audio output device 200 is not received from the mobile terminal 100, the rear seat entertainment unit 300 recognizes it as the mobile terminal is not wirelessly connected with the audio output device 200 and may be able to transmit a pairing information request termination signal to the control unit 400 while stopping the request of the pairing information.

Having received the pairing information of the audio output device 200 from the mobile terminal 100, the rear seat entertainment unit 300 can transmit the pairing information of the audio output device 200 to the control unit 400.

Figure 6:
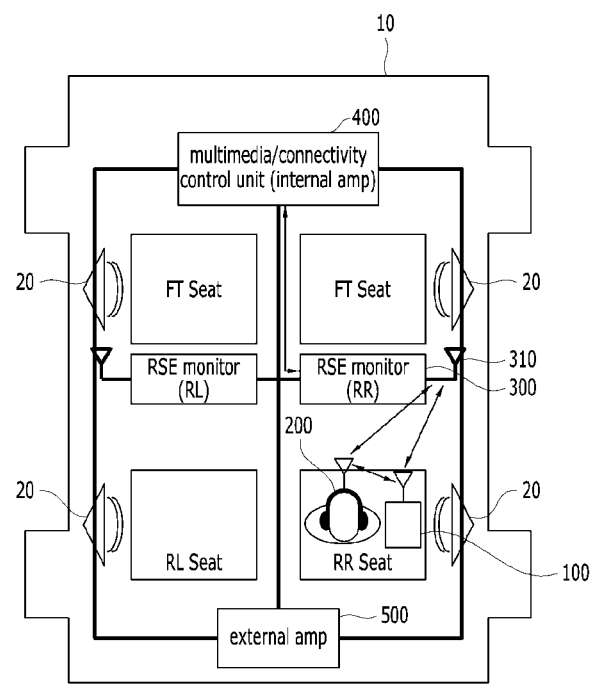

Subsequently, as shown in FIG. 6, if the control unit 400 receives the pairing information of the audio output device 200 from the mobile terminal 100, the control unit 400 can control the rear seat entertainment unit 300 to be wirelessly connected with the audio output device 200.

In this case, when the control unit 400 receives the pairing information of the audio output device 200 from the rear seat entertainment unit 300, the control unit 400 checks whether or not at least one of information on the audio output device 200 or an authentication code is included in the pairing information. If the at least one of the information on the audio output device 200 or the authentication code is included in the pairing information, the control unit 400 can store the pairing information.

When the audio output device 200 is automatically and wirelessly connected with the rear seat entertainment unit 300, the audio output device 200 can continuously maintain a wireless connection with the mobile terminal 100.

In particular, a multi-connection function can be added to the audio output device 200. When the audio output device 200 is able to support the multi-connection function, if the audio output device 200 is automatically and wirelessly connected with the rear seat entertainment unit 300, the audio output device 200 can continuously maintain a wireless connection with the mobile terminal 100.

In a different case, when the rear seat entertainment unit 300 is automatically and wirelessly connected with the audio output device 200 of the passenger, the audio output device 200 may block a wireless connection with the mobile terminal 100.

In particular, when the audio output device 200 does not support the multi-connection function, if the audio output device 200 is automatically and wirelessly connected with the rear seat entertainment unit 300, the audio output device 200 may block a wireless connection with the mobile terminal 100.

According to embodiments of the present disclosure, user convenience can be enhanced by automatically and wirelessly connecting the rear seat entertainment unit of the vehicle with the audio output device of the passenger by receiving pairing information of the audio output device from the mobile terminal wirelessly connected with the audio output device of the passenger via the rear seat entertainment unit.

When the rear seat entertainment unit of the vehicle is automatically and wirelessly connected with the audio output device of the passenger, if the audio output device of the passenger uses the rear seat entertainment unit, since media played at a front seat (FRT) is outputted from a speaker of the vehicle, the media may act as noise. Hence, it is necessary to have additional sound processing.

A sound processing method according to embodiments of the present disclosure is described below.

Figure 7:
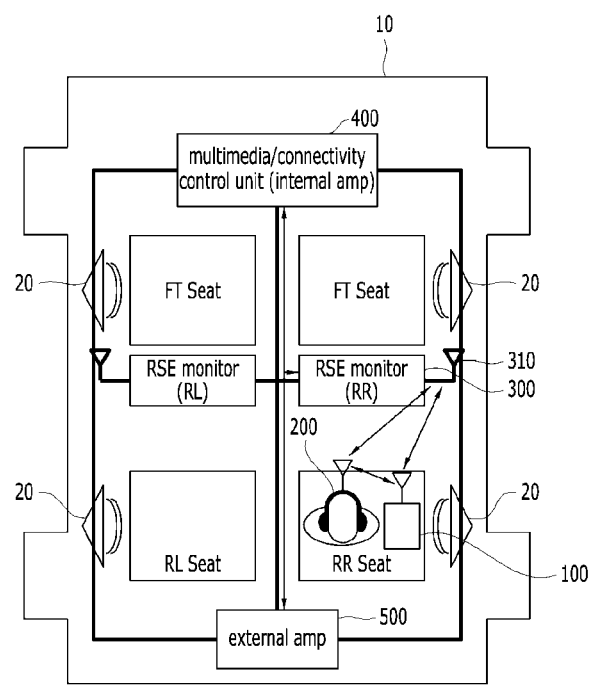

As shown in FIG. 7, if the rear seat entertainment unit 300 is automatically and wirelessly connected with the audio output device 200 of a vehicle passenger, the control unit 400 can transmit a music source playback sound synchronization request signal to the sound processing unit 500.

In this case, the control unit 400 can be connected with the sound processing unit 500 configured to process music source playback sound of a front multimedia. For example, the sound processing unit 500 can include an external amplifier having a sound processing module.

The control unit 400 determines whether or not a music source of a front multimedia unit is played. If the music source of the front multimedia unit is played, the control unit 400 can transmit a music source playback sound synchronization request signal to the sound processing unit 500.

In this case, when the music source playback sound synchronization request signal is transmitted to the sound processing unit 500, the control unit 400 can request information on the playback sound input volume value measured at the audio output device 200 to the rear seat entertainment unit 300.

Figure 8:
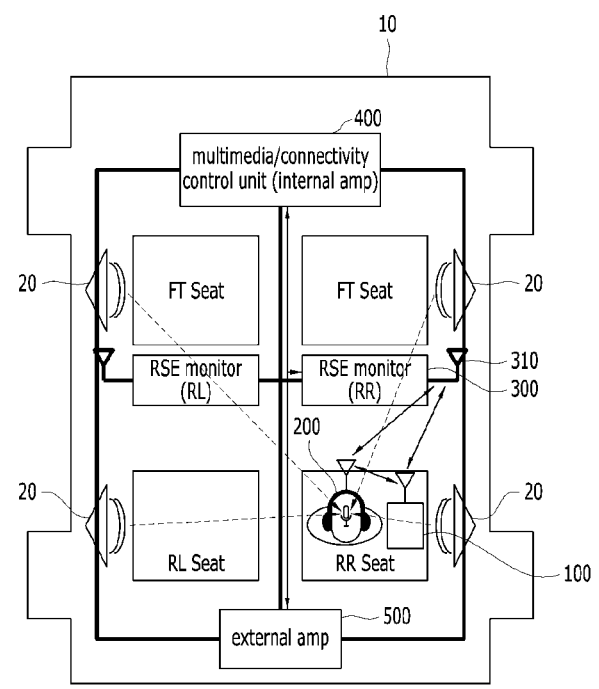

Subsequently, as shown in FIG. 8, the control unit 400 can request information on the playback sound input volume value measured at the audio output device 200 to the rear seat entertainment unit 300.

Also, when music source playback sound of a front multimedia unit is outputted via a vehicle speaker 20, the audio output device 200 can measure an input volume value of the music source playback sound by receiving the music source playback sound.

In this case, the audio output device 200 can include a noise-canceling microphone configured to measure the input volume value of the music source playback sound.

In particular, when the audio output device 200 is automatically and wirelessly connected with the rear seat entertainment unit 300, if an input volume value request signal of the music source playback sound is received from the rear seat entertainment unit 300, the audio output device 200 can transmit the measured input volume value of the music source playback sound to the rear seat entertainment unit 300.

The control unit 400 receives information on the playback sound input volume value measured by the audio output device 200 from the rear seat entertainment unit 300 and can transmit the information on the playback sound input volume value of the audio output device 200 to the sound processing unit 500.

Figure 9:
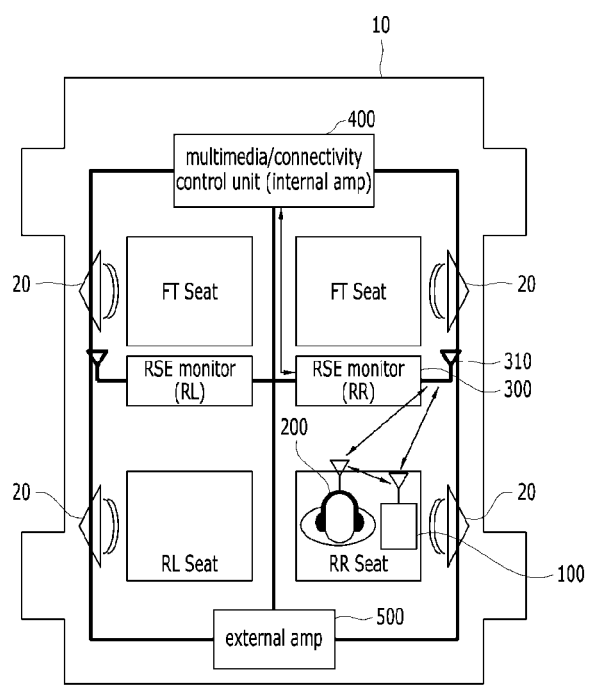

Subsequently, as shown in FIG. 9, having received the playback sound input volume value measured by the audio output device 200 from the control unit 400, the sound processing unit 500 can calculate a playback sound output adjustment value based on a playback sound output volume value outputted from the vehicle speaker 20 and the playback sound input volume value measured at the audio output device 200.

In particular, if the sound processing unit 500 receives a music source playback sound synchronization request signal from the control unit 400, the sound processing unit calculates the playback sound output adjustment value based on the playback sound output volume value outputted from the vehicle speaker 20 and the playback sound input volume value measured at the audio output device 200 according to the music source playback sound synchronization request signal and can transmit the calculated playback sound output adjustment value to the control unit 400.

For example, if the sound processing unit 500 receives the music source playback sound synchronization request signal from the control unit 400, the sound processing unit measures the playback sound output volume value outputted from the vehicle speaker 20. If the sound processing unit 500 receives the playback sound input volume value measured at the audio output device 200, the sound processing unit calculates the playback sound output adjustment value based on the playback sound output volume value outputted from the vehicle speaker 20 and the playback sound input volume value measured at the audio output device 200.

In this case, when the playback sound output adjustment value is calculated, the sound processing unit 500 can calculate a difference value between the playback sound output volume value outputted from the vehicle speaker 20 and the playback sound input volume value measured from the audio output device 200 to calculate the playback sound output adjustment value.

Subsequently, if the playback sound output adjustment value is received from the sound processing unit 500, the control unit 400 corrects music source playback sound based on the received playback sound output adjustment value and can transmit the corrected music source playback sound to the audio output device 200 of the passenger via the rear seat entertainment unit 300.

In this case, when the control unit 400 transmits the corrected music source playback sound, the control unit 400 can transmit an image signal corresponding to the music source playback sound to the rear seat entertainment unit 300 to display an image corresponding to the music source playback sound.

For example, when the control unit 400 transmits the image signal corresponding to the music source playback sound to the rear seat entertainment unit 300, the image signal may correspond to, for example, a media image stored in the vehicle 10 in advance, a media image received from an interface of the vehicle 10, or a media image of the mobile terminal 100 received via the rear seat entertainment unit 300.

In particular, according to embodiments of the present disclosure, the sound processing unit calculates a playback sound output adjustment value based on a playback sound output volume value outputted from a vehicle speaker and a playback sound input volume value measured by the audio output device, corrects playback sound of an image based on the calculated playback sound output adjustment value, and transmits the corrected playback sound to the audio output device of a passenger. By doing so, it is able to provide image playback sound of which noise cancelation efficiency is enhanced to the passenger.

Figure 10:
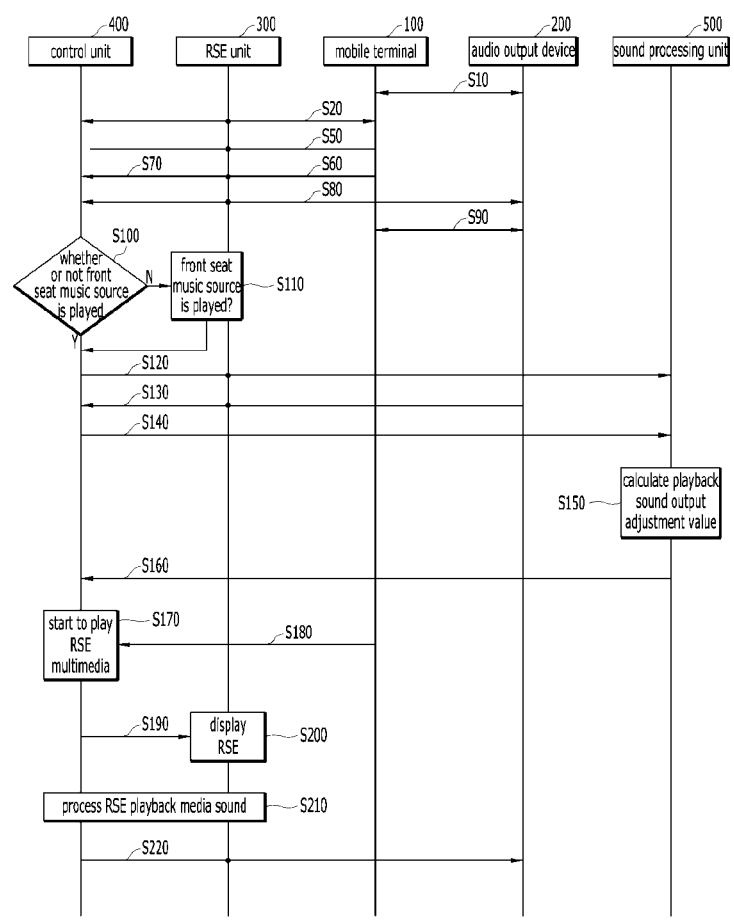
FIG. 10 is flowchart for explaining a wireless connection and a sound processing procedure of an entertainment system of a vehicle according to embodiments of the present disclosure.

FIG. 10 is flowchart for explaining a wireless connection and a sound processing procedure of an entertainment system of a vehicle according to embodiments of the present disclosure.

As shown in FIG. 10, if a vehicle passenger wearing an audio output device 200, which is wirelessly connected with a mobile terminal 100 via hands-free and streaming wireless connection, takes a rear seat of a vehicle [S10], a rear seat entertainment unit 300 of the vehicle can be wirelessly connected with the mobile terminal 100 of the passenger [S20].

In this case, the rear seat entertainment unit 300 can include an RF antenna. The rear seat entertainment unit can be connected with the mobile terminal via the RF antenna.

Subsequently, if the rear seat entertainment unit 300 is wirelessly connected with the mobile terminal 100, a control unit 400 can be connected with the rear seat entertainment unit 300, which is wirelessly connected with the mobile terminal 100 [S30].

In this case, the control unit 400 may correspond to a control unit of multimedia and connectivity.

Subsequently, the control unit 400 can request pairing information of the audio output device 200 to the mobile terminal 100 via the rear seat entertainment unit 300 [S50].

Subsequently, the control unit 400 can receive the pairing information of the audio output device 200 from the mobile terminal 100 via the rear seat entertainment unit 300 [S60, S70].

Subsequently, the control unit 400 can control the rear seat entertainment unit 300 to make the rear seat entertainment unit 300 to be wirelessly connected with the audio output device 200 [S80].

In this case, when the control unit 400 receives the pairing information of the audio output device 200 from the rear seat entertainment unit 300, the control unit 400 determines whether or not at least one of information on the audio output device 200 or an authentication code is included in the pairing information. If the at least one of the information on the audio output device 200 or the authentication code is included in the pairing information, the control unit 400 can store the pairing information.

When the rear seat entertainment unit 300 is automatically and wirelessly connected with the audio output device 200 of the passenger, the audio output device 200 of the passenger can continuously maintain a wireless connection with the mobile terminal 100.

In particular, a multi-connection supporting function can be added to the audio output device 200. When the audio output device 200 is able to support the multi-connection function, if the audio output device 200 is automatically and wirelessly connected with the rear seat entertainment unit 300, the audio output device 200 can continuously maintain a wireless connection with the mobile terminal 100.

In a different case, when the rear seat entertainment unit 300 is automatically and wirelessly connected with the audio output device 200 of the passenger, the audio output device 200 may block a wireless connection with the mobile terminal 100.

In particular, when the audio output device 200 does not support the multi-connection function, if the audio output device 200 is automatically and wirelessly connected with the rear seat entertainment unit 300, the audio output device 200 may block a wireless connection with the mobile terminal 100.

Subsequently, if the rear seat entertainment unit 300 is automatically and wirelessly connected with the audio output device 200 of the vehicle passenger, the control unit 400 determines whether or not a music source of a front multimedia unit is played [S100].

Subsequently, if the music source of the front multimedia unit is played, the control unit 400 can transmit a music source playback sound synchronization request signal to the sound processing unit 500 [S120].

On the contrary, if the music source of the front multimedia unit is not played, the control unit 400 determines whether or not music source playback starts [S110]. When the music source playback starts, the control unit 400 can transmit a music source playback sound synchronization request signal to the sound processing unit 500 [S120].

In this case, when the music source playback sound synchronization request signal is transmitted to the sound processing unit 500, the control unit 400 can request information on a playback sound input volume value measured at the audio output device 200 to the rear seat entertainment unit 300.

Subsequently, the control unit 400 can receive the information on the playback sound input volume value measured at the audio output device 200 via the rear seat entertainment unit 300 [S130].

The control unit 400 can transmit the received information on the playback sound input volume value of the audio output device 200 to the sound processing unit 500 [S140].

Subsequently, having received the information on the playback sound input volume value measured at the audio output device 200 from the control unit 400, the sound processing unit 500 can calculate a playback sound output adjustment value based on a playback sound output volume value outputted from a vehicle speaker and a playback sound input volume value measured from the audio output device 200 [S150].

Subsequently, the sound processing unit 500 can transmit a corrected value of the calculated playback sound output adjustment value to the control unit 400 [S160].

For example, when the playback sound output adjustment value is calculated, the sound processing unit 500 calculates a difference value between the playback sound output volume value outputted from the vehicle speaker and the playback sound input volume value measured by the audio output device 200 to calculate the playback sound output adjustment value.

Subsequently, the control unit 400 can start to play multimedia of the rear seat entertainment unit 300 [S170].

In this case, the multimedia of the rear seat entertainment unit 300 may correspond to, for example, a media stored in the vehicle in advance, a media received from an interface of the vehicle, or a media of the mobile terminal 100 received via the rear seat entertainment unit 300 [S180].

Subsequently, the control unit 400 can transmit an image signal to the rear seat entertainment unit 300 to display an image on the rear seat entertainment unit 300 [S190].

Subsequently, the rear seat entertainment unit 300 can display the received image on a monitor [S200].

Subsequently, if the control unit 400 receives the playback sound output adjustment value from the sound processing unit 500, the control unit 400 can correct music source playback sound based on the received playback sound output adjustment value [S210].

In this case, the correction of the music source playback sound can be calculated by the equation set forth below.

music source playback sound correction value=RSE playback media music source output waveform (P_rse)+((FRT phase reverse waveform of FRT multimedia music source output (R_frt_reverse)×k (tuning constant)×AP (distance correction))

The control unit 400 can transmit corrected music source playback sound to the audio output device 200 of the passenger via the rear seat entertainment unit 300 [S220].

According to pairing information the present disclosure, user convenience can be enhanced by receiving pairing information of an audio output device from a mobile terminal wirelessly connected to the audio output device of the passenger via a rear seat entertainment (RSE) unit and automatically and wirelessly connecting the rear seat entertainment unit of a vehicle with the audio output unit of the passenger.

According to pairing information the present disclosure, image playback sound of which a noise cancelation efficiency is enhanced can be provided in a manner that a sound processing unit calculates a playback sound output adjustment value based on a playback sound output volume value outputted from a vehicle speaker and a playback sound input volume value measured from an audio output device, corrects image playback sound based on the calculated value, and transmits the corrected image playback sound to an audio output device of a passenger.

Figure 11:
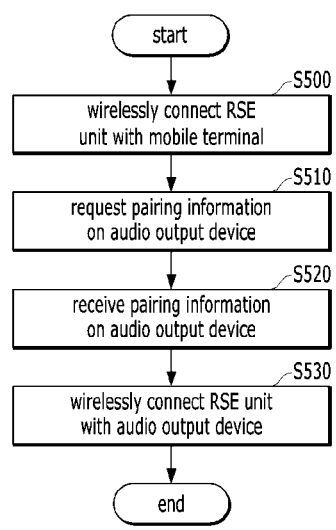
FIG. 11 is a flowchart for explaining a wireless connection method of an entertainment system of a vehicle according to embodiments of the present disclosure.

FIG. 11 is a flowchart for explaining a wireless connection method of an entertainment system of a vehicle according to embodiments of the present disclosure.

As shown in FIG. 11, if a mobile terminal, which is wirelessly connected with an audio output device of a vehicle passenger, is positioned within a vehicle, a rear seat entertainment unit according to the present disclosure can be wirelessly connected with the mobile terminal [S500].

Also, a control unit according to the present disclosure can be connected with the rear seat entertainment unit which is wirelessly connected with the mobile terminal.

Subsequently, the control unit of the present disclosure can request pairing information of the audio output device to the rear seat entertainment unit [S510].

In this case, when the control unit requests the pairing information of the audio output device to the rear seat entertainment unit, the control unit checks whether or not a music source of a front multimedia unit is played. If the music source of the front multimedia unit is played, the control unit can request the pairing information of the audio output device to the rear seat entertainment unit.

In some cases, when the control unit requests the pairing information of the audio output device to the rear seat entertainment unit, the control unit determines whether or not the rear seat entertainment unit is connected with the mobile terminal. If the rear seat entertainment unit is connected with the mobile terminal, the control unit can request the pairing information of the audio output device to the rear seat entertainment unit.

Subsequently, if the rear seat entertainment unit receives a pairing information request signal for the audio output device from the control unit, the rear seat entertainment unit can request the pairing information of the audio output device to the mobile terminal.

In this case, when the rear seat entertainment unit requests the pairing information of the audio output device to the mobile terminal, if the pairing information of the audio output device is not received from the mobile terminal for more than predetermined time, the rear seat entertainment unit may request the pairing information of the audio output device to the mobile terminal again.

Furthermore, when the rear seat entertainment unit requests the pairing information of the audio output device to the mobile terminal again, if the pairing information of the audio output device is not received from the mobile terminal for more than predetermined time, the rear seat entertainment unit may request the pairing information of the audio output device to the mobile terminal again according to a predetermined request count.

Also, when the rear seat entertainment unit repeatedly requests the pairing information of the audio output device to the mobile terminal again according to the predetermined request count, if the pairing information of the audio output device is not received from the mobile terminal, the rear seat entertainment unit recognizes it as the mobile terminal is not connected with the audio output device and may be able to transmit a pairing information request termination signal to the control unit while stopping the request of the pairing information.

Having received the pairing information of the audio output device from the mobile terminal, the rear seat entertainment unit can transmit the received pairing information of the audio output device to the control unit.

Subsequently, the control unit can receive the pairing information of the audio output device from the rear seat entertainment unit [S520].

In this case, when the control unit receives the pairing information of the audio output device from the rear seat entertainment unit, the control unit checks whether or not at least one of information on the audio output device or an authentication code is included in the pairing information. If the at least one of the information on the audio output device or the authentication code is included in the pairing information, the control unit can store the pairing information.

Having received the pairing information of the audio output unit from the rear seat entertainment unit, the control unit can control the rear seat entertainment unit to be wirelessly connected with the audio output device.

Also, the rear seat entertainment unit can be automatically and wirelessly connected with the audio output device according to the control of the control unit [S530].

In this case, when the rear seat entertainment unit is automatically and wirelessly connected with the audio output device, if the audio output device is automatically and wirelessly connected with the rear seat entertainment unit, the rear seat entertainment unit can continuously maintain a wireless connection with the mobile terminal.

In some cases, when the rear seat entertainment unit is automatically and wirelessly connected with the audio output device, if the audio output device is automatically and wirelessly connected with the rear seat entertainment unit, the rear seat entertainment unit may block a wireless connection with the mobile terminal.

According to embodiments of the present disclosure, user convenience can be enhanced by receiving pairing information of an audio output device from a mobile terminal wirelessly connected to the audio output device of a passenger via a rear seat entertainment (RSE) unit and automatically and wirelessly connecting a rear seat entertainment unit of a vehicle with the audio output unit of the passenger.

Figure 12:
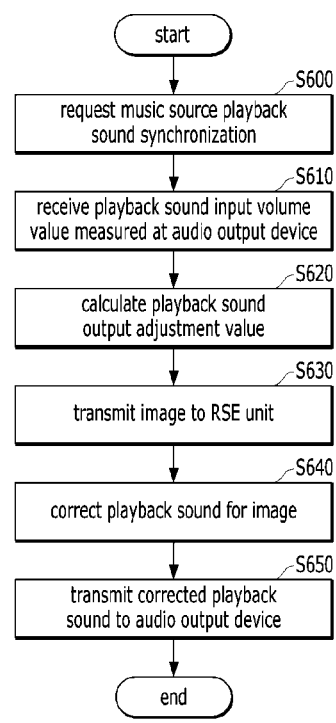
FIG. 12 is a flowchart for explaining a sound processing method of an entertainment system of a vehicle according to embodiments the present disclosure.

FIG. 12 is a flowchart for explaining a sound processing method of an entertainment system of a vehicle according to embodiments of the present disclosure.

As shown in FIG. 12, if a rear seat entertainment unit is automatically and wirelessly connected with an audio output device of a vehicle passenger, a control unit of the present disclosure can transmit a music source playback sound synchronization request signal to a sound processing unit [S600].

In this case, when the control unit transmits the music source playback sound synchronization request signal to the sound processing unit, the control unit checks whether or not a music source of a front multimedia unit is played. If the music source of the front multimedia unit is played, the control unit can transmit a music source playback sound synchronization request signal to the sound processing unit.

In some cases, when the music source playback sound synchronization request signal is transmitted to the sound processing unit, the control unit may request information on a playback sound input volume value measured at the audio output device to the rear seat entertainment unit.

Subsequently, the control unit can transmit the received information on the playback sound input volume value measured at the audio output device to the sound processing unit.

Subsequently, having received the playback sound input volume value measured at the audio output device from the control unit, the sound processing unit can calculate a playback sound output adjustment value based on a playback sound output volume value outputted from a vehicle speaker and the playback sound input volume value measured at the audio output device and transmit the calculated playback sound output adjustment value to the control unit [S620].

Subsequently, the control unit can transmit an image signal to the rear seat entertainment unit [S630].

Subsequently, the control unit can correct music source sound corresponding to the image signal based on the received playback sound output adjustment value [S640].

Subsequently, the control unit can transmit the corrected music source playback sound to the audio output device of the passenger via the rear seat entertainment unit [S650].

In particular, according to embodiments of the present disclosure, image playback sound of which a noise cancelation efficiency is enhanced can be provided in a manner that a sound processing unit calculates a playback sound output adjustment value based on a playback sound output volume value outputted from a vehicle speaker and a playback sound input volume value measured from an audio output device, corrects image playback sound based on the calculated value, and transmits the corrected image playback sound to the audio output device of a passenger.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An entertainment system of a vehicle, comprising:
  a mobile terminal of a passenger;
  an audio output device of the passenger wirelessly connected with the mobile terminal;
  a rear seat entertainment unit wirelessly connected with the mobile terminal; and
  a control unit connected with the rear seat entertainment unit, the control unit configured to control the rear seat entertainment unit so as to automatically and wirelessly connect with the audio output device when pairing information of the audio output device is requested by the rear seat entertainment unit and the pairing information of the audio output device is received by the rear seat entertainment unit,
  wherein:
  the rear seat entertainment unit requests the pairing information of the audio output device from the mobile terminal when the pairing information of the audio output device is received from the control unit, and
  the rear seat entertainment unit transmits the pairing information of the audio output device to the control unit when the pairing information of the audio output device is received from the mobile terminal.

2. The entertainment system of the vehicle of claim 1, wherein the audio output device corresponds to a device selected from a group consisting of: a wireless headphone, a wireless earphone, a wireless headset, and a wireless ear set.

3. The entertainment system of the vehicle of claim 1, wherein the audio output device comprises a noise-canceling microphone configured to receive a music source playback sound of a front multimedia unit of the vehicle outputted via a vehicle speaker and measure an input volume value of the music source playback sound.

4. The entertainment system of the vehicle of claim 3, wherein the audio output device transmits the measured input volume value of the music source playback sound to the rear seat entertainment unit when the audio output device is wirelessly connected with the rear seat entertainment unit and receives an input volume value request signal from the rear seat entertainment unit.

5. The entertainment system of the vehicle of claim 1, wherein:
the rear seat entertainment unit comprises radio frequency (RF) antenna, and
the rear seat entertainment unit automatically connects with the mobile terminal and the control unit via the RF antenna when the mobile terminal is positioned within the vehicle.

6. The entertainment system of the vehicle of claim 1, wherein:
the control unit determines whether a music source of a front multimedia unit of the vehicle is played when the pairing information of the audio output device is requested from the rear seat entertainment unit, and
the control unit requests the pairing information of the audio output device from the rear seat entertainment unit when the music source of the front multimedia unit is played.

7. The entertainment system of the vehicle of claim 1, wherein:
the control unit determines whether the rear seat entertainment unit is connected with the mobile terminal when the pairing information of the audio output device is requested from the rear seat entertainment unit, and
the control unit requests the paring information of the audio output device from the rear seat entertainment unit when the rear seat entertainment unit is connected with the mobile terminal.

8. The entertainment system of the vehicle of claim 1, wherein:
the control unit determines whether at least one of information of the audio output device and an authentication code is included in the pairing information of the audio output device when the pairing information of the audio output device is received from the rear seat entertainment unit, and
the control unit stores the pairing information of the audio output device when the at least one of the information of the audio output device and the authentication code is included in the pairing information of the audio output device.

9. The entertainment system of the vehicle of claim 1, further comprising a sound processing unit configured to process a music source playback sound of a front multimedia unit of the vehicle,
wherein, when a music source playback sound synchronization request signal is received from the control unit, the sound processing unit calculates a playback sound output adjustment value based on a playback sound output volume value outputted from a vehicle speaker and a playback sound input volume value measured by the audio output device according to the music source playback sound synchronization request signal, and the sound processing unit transmits the calculated playback sound output adjustment value to the control unit.

10. The entertainment system of the vehicle of claim 9, wherein:
the sound processing unit measures the playback sound output volume value outputted from the vehicle speaker when the music source playback sound synchronization request signal is received from the control unit, and
the sound processing unit calculates the playback sound output adjustment value based on the playback sound output volume value outputted from the vehicle speaker and the playback sound input volume value measured by the audio output device when the playback sound input volume value measured by the audio output device is received from the control unit.

11. The entertainment system of the vehicle of claim 10, wherein the sound processing unit calculates the playback sound output adjustment value by calculating a difference between the playback sound output volume value outputted from the vehicle speaker and the playback sound input volume value measured by the audio output device.

12. The entertainment system of the vehicle of claim 9, wherein:
the control unit determines whether a music source of the front multimedia unit is played, and
the control unit transmits the music source playback sound synchronization request signal to the sound processing unit when the music source of the front multimedia unit is played.

13. The entertainment system of the vehicle of claim 9, wherein the control unit corrects the music source playback sound based on the received playback sound output adjustment value and transmits the corrected music source playback sound to the audio output device via the rear seat entertainment unit when the playback sound output adjustment value is received from the sound processing unit.

14. A method of wirelessly connecting an entertainment system of a vehicle containing a control unit and a rear seat entertainment unit, the method comprising:
wirelessly connecting the rear seat entertainment unit with a mobile terminal of a passenger when the mobile terminal is positioned within the vehicle, the mobile terminal being wirelessly connected with an audio output device of the passenger;
connecting the control unit with the rear seat entertainment unit;
requesting, by the control unit, that pairing information of the audio output device be transmitted to the rear seat entertainment unit;
requesting, by the rear seat entertainment unit, the pairing information of the audio output device from the mobile terminal when the rear seat entertainment unit receives a request signal for the pairing information of the audio output device from the control unit;
transmitting, by the rear seat entertainment unit, the pairing information of the audio output device to the control unit when the rear seat entertainment unit receives the pairing information of the audio output device from the mobile terminal; and
controlling, by the control unit, the rear seat entertainment unit so as to automatically and wirelessly connect with the audio output device when the control unit receives the pairing information of the audio output device from the rear seat entertainment unit.

15. The method of claim 14, wherein the requesting that the pairing information of the audio output device be transmitted to the rear seat entertainment unit comprises:
- determining whether a music source of a front multimedia unit of the vehicle is played; and
- requesting that the pairing information of the audio output device be transmitted to the rear seat entertainment unit when the music source of the front multimedia unit is played.

16. The method of claim 14, wherein the receiving of the pairing information of the audio output device from the rear seat entertainment unit by the control unit comprises:
- determining whether at least one of information of the audio output device and an authentication code is included in the pairing information of the audio output device; and
- storing the pairing information of the audio output device when the at least one of the information of the audio output device and the authentication code is included in the pairing information of the audio output device.

17. An entertainment system of a vehicle, comprising:
a mobile terminal of a passenger;
an audio output device of the passenger wirelessly connected with the mobile terminal;
a rear seat entertainment unit wirelessly connected with the mobile terminal; and
a control unit connected with the rear seat entertainment unit, the control unit configured to control the rear seat entertainment unit so as to automatically and wirelessly connect with the audio output device when pairing information of the audio output device is requested by the rear seat entertainment unit and the pairing information of the audio output device is received by the rear seat entertainment unit, wherein:
the control unit determines whether the rear seat entertainment unit is connected with the mobile terminal when the pairing information of the audio output device is requested from the rear seat entertainment unit, and
the control unit requests the paring information of the audio output device from the rear seat entertainment unit when the rear seat entertainment unit is connected with the mobile terminal.

* * * * *